Jan. 15, 1935.  E. B. NORMAN ET AL  1,987,748
LATERALLY FED HIGH PRESSURE GREASE GUN
Filed June 22, 1934  3 Sheets-Sheet 1
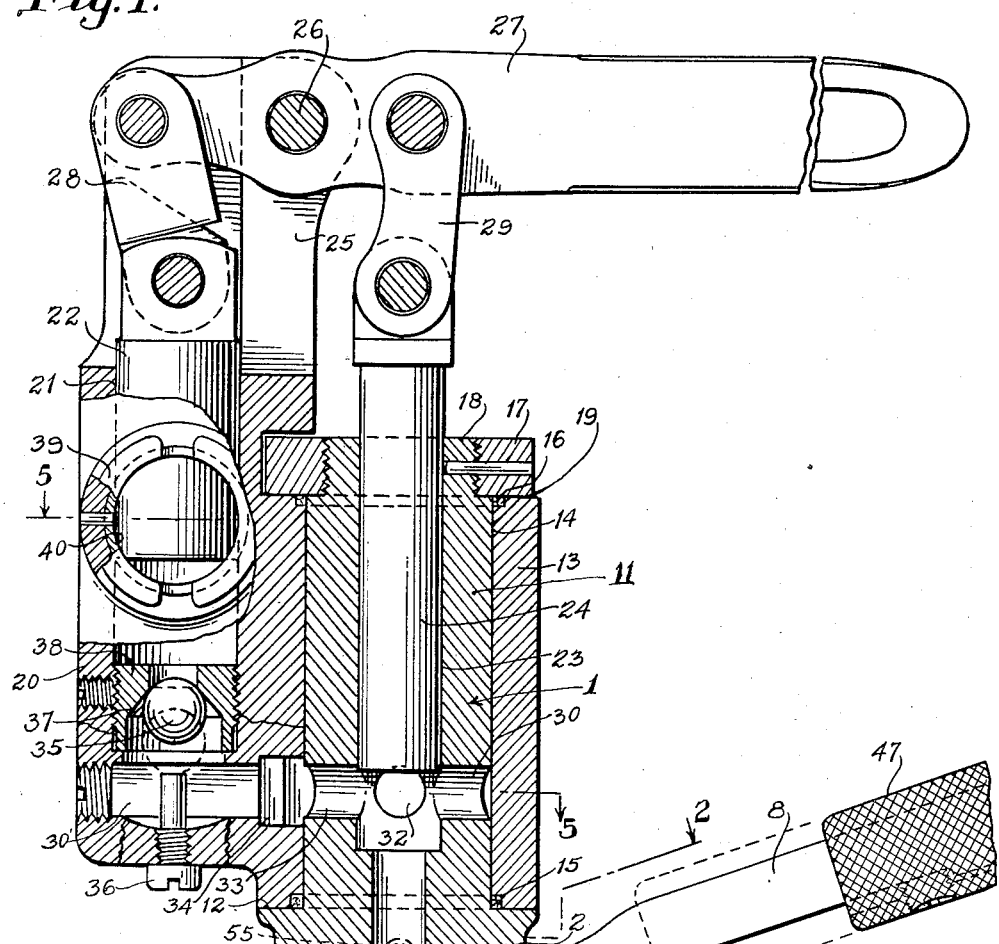
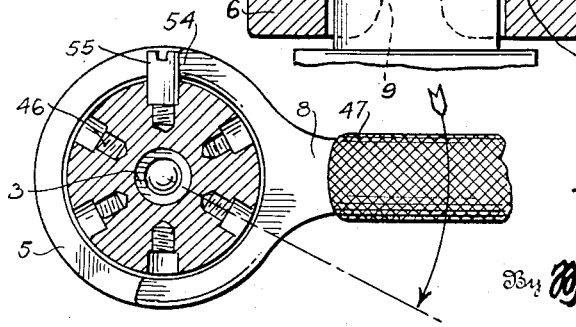
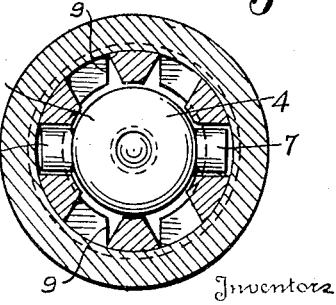
E. B. NORMAN and
G. A. PETTIT

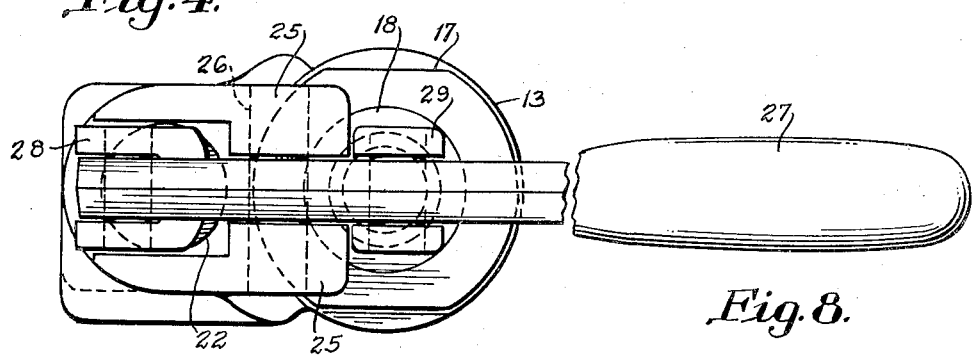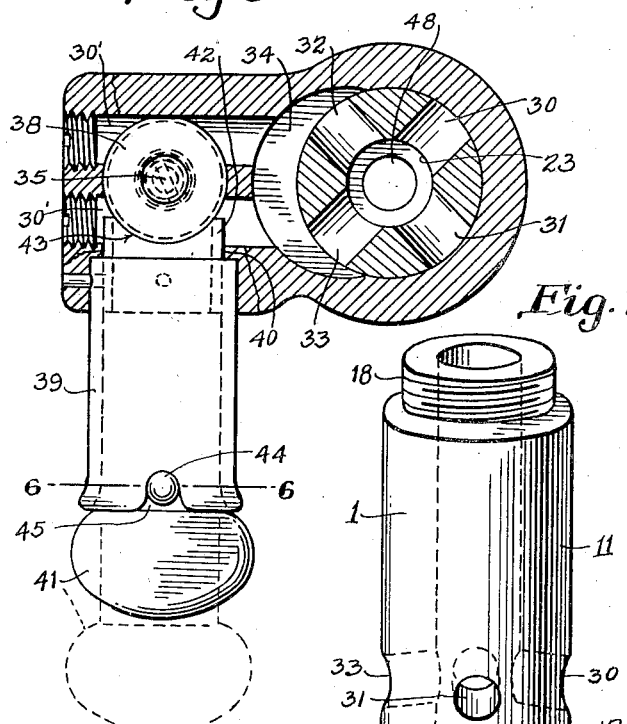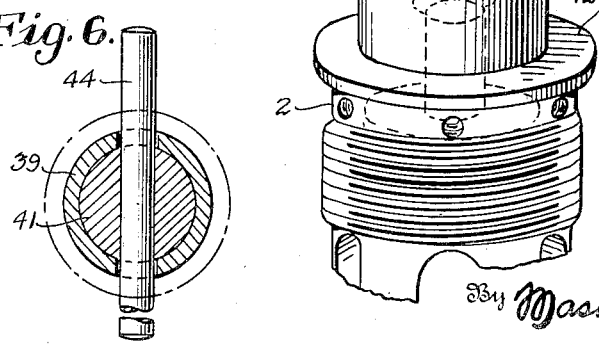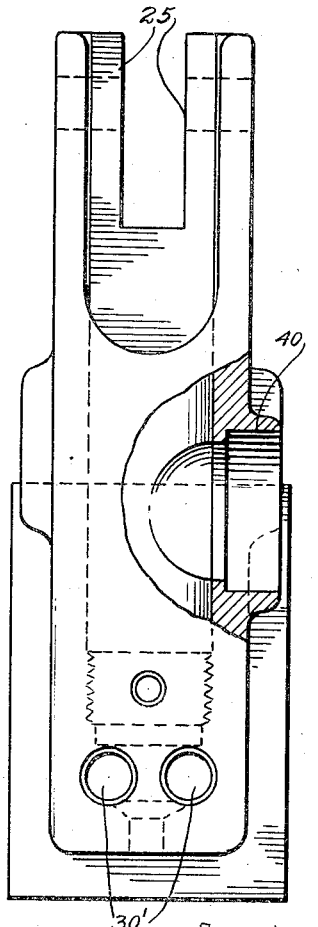

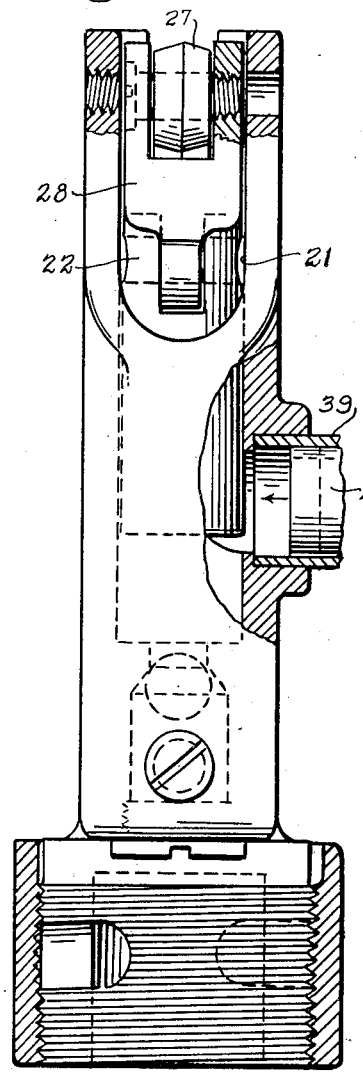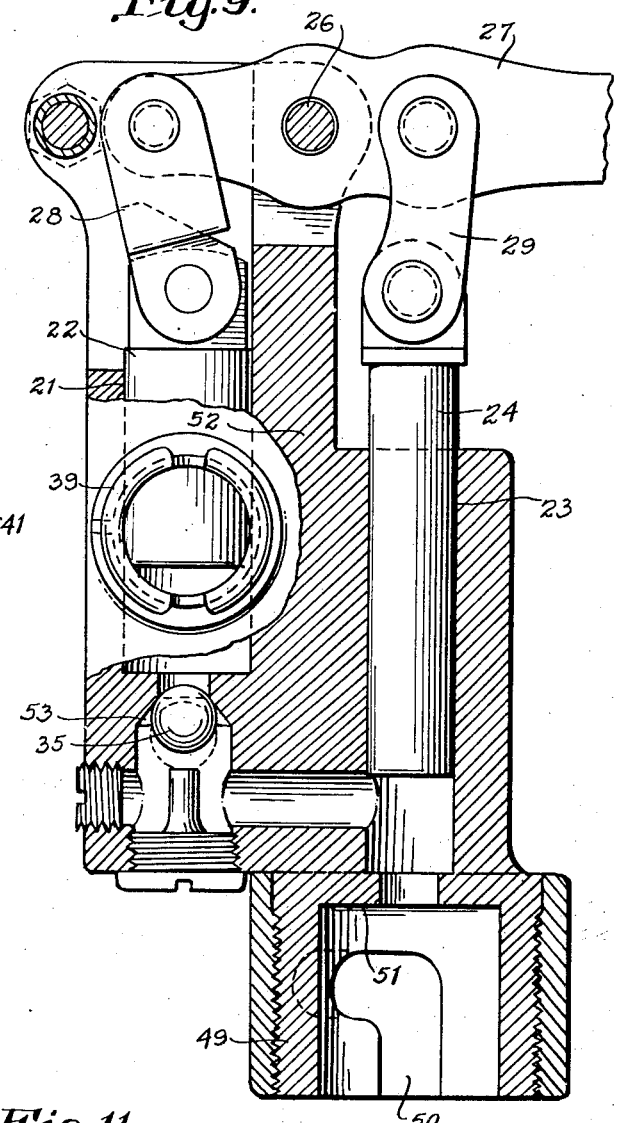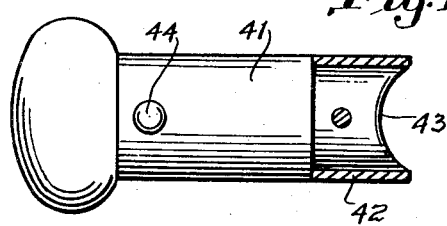

Patented Jan. 15, 1935

1,987,748

UNITED STATES PATENT OFFICE

1,987,748

LATERALLY FED HIGH PRESSURE GREASE GUN

Ernest B. Norman and George A. Pettit, New Orleans, La., assignors to Reliance Machine & Stamping Works, Inc., New Orleans, La., a corporation of Louisiana Application June 22, 1934, Serial No. 731,980

12 Claims. (Cl. 221—47.4)

This invention relates to grease guns of the type designed for the extrusion of heavy grease under great pressure. The grease gun of the present invention is particularly, although not exclusively, adapted to the lubrication of heavy bearings, as those of locomotives, with grease of such firm consistency that it is fed to the gun in the form of "sticks".

Grease guns are known in which heavy grease in stick form is fed laterally into the barrel of the gun, to be cut off by the piston upon its descent, but the extrusive capacity of such guns is reduced proportionately by that part of the piston travel which is occupied in shearing off the charge of grease, since the compressing function of the piston cannot substantially begin until the end of the piston has entirely traversed the port through which the grease is fed. The result is that a relatively small quantity of grease is extruded at one stroke, in grease guns of known construction.

One of the objects of the present invention is to provide a grease gun of the lateral feed type in which the compressive disability of the piston while traversing the feed port is compensated by the provision of an additional or high compression cylinder, the piston of which performs the compressing or extruding function throughout its entire stroke.

Another object of the invention is to provide an efficient check valve construction between the low and high pressure cylinders which shall close against the pressure of the high compression piston.

A further object of the invention is to provide safety means in the form of a pusher for feeding the grease stick into the gun, avoiding the necessity of pushing the grease in with the fingers with the attendant danger of having the finger amputated through accidental descent of the piston.

Still another object of the invention resides in the provision of a grease gun of the type described, in which the low pressure cylinder with which the operating handle of the grease gun is unitary, rotates about the high compression cylinder and in constant communication therewith, permitting the operating handle to be oriented at will into a position most convenient for the operation of the grease gun. It is to be understood that the function of the two cylinders is not to boost or supercompress the grease in the high pressure cylinder, but to provide an auxiliary cylinder of relatively larger diameter having a volume below its lateral intake opening equal to the entire piston displacement of the high pressure cylinder so that the latter can be filled by a single stroke of the low pressure piston.

Other objects of the invention will appear as the following description of preferred and practical embodiments thereof proceed.

In the drawings which accompany and form a part of the following specification and throughout the several figures of which the same characters of reference have been employed to designate identical parts:

Figure 1 is a vertical section through a grease gun embodying one modification of the invention;

Figure 2 is a cross section taken along the line 2—2 of Figure 1;

Figure 3 is a cross section taken along the line 3—3 of Figure 1;

Figure 4 is a plan view of the grease gun shown in Figure 1;

Figure 5 is a cross section partly in plan taken along the line 5—5 of Figure 1;

Figure 6 is a cross section taken along the line 6—6 of Figure 5;

Figure 7 is a perspective view of the high pressure cylinder constituting the axis about which the low pressure cylinder and handle revolve;

Figure 8 is a side elevation partly in section showing the detailed construction of the casting constituting the low pressure cylinder and its appurtenant parts;

Figure 9 is a vertical section through a modified form of the invention in which a low pressure cylinder is fixed relative to the high pressure cylinder;

Figure 10 is an end elevation partly in section; and

Figure 11 is a sectional view through the pusher.

Referring now in detail to that form of the invention illustrated in the group of figures from 1 to 8, inclusive, the numeral 1 represents a metallic body consisting of cylindrical portions of different diameter, the lower part 2 of which is formed with a counterbore having the bottom face 3 thereof carefully machined in a plane perpendicular to the axis of the body and adapted to rest sealingly and non-rotatably upon the upper face of a nipple 4, the latter being fixed to the part to be lubricated. The lower part 2 is externally threaded to receive an internally threaded bushing 5 having an inturned flange 6 at its lower end adapted to come up into engagement with the lower sides of pins 7 which project from the sides of the nipple 4 when the bushing 5 is screwed upwardly upon the lower part 2 by means of the handle 8. The flange 6 has diametrically opposed vertical slots 9 of at least pin width, permitting the gun to be slipped over the bearing and the lower part 2 is formed with a plurality of vertical slots 10 arranged in diametrical pairs with any pair of which the slots 9 may be selectively alined in locating the gun upon the bearing. The slots 10 prevent the face 3 from rotating upon the upper face of the nipple when the gun is being tightened upon the nipple.

The upper part 11 of the body 1 is of less diameter than the lower part forming an annular shoulder 12 upon which rests the rotatable member 13, the latter having a bore 14 making a close fit with the outer cylindrical surface of the upper part of the body 1 and rotating axially thereabout. Packing 15 seals the lower end of the joint between the fixed and rotatable members, while at the upper end, a packing ring 16 is screwed down into sealing relation with the joint by means of the nut 17 threaded upon the reduced end 18 of the body and overlying the upper portion 19 of the rotatable member 13.

The latter member has an off-set portion 20 having a cylindrical bore 21, constituting the low pressure cylinder. A piston 22 reciprocates in said cylinder. The body 1 is also formed with a bore 23 constituting the high pressure cylinder, in which reciprocates the high pressure piston 24. Between the said pistons, the rotatable member 13 is formed with an upstanding lug 25 affording a pivotal connection 26 for the operating handle 27. On the respective sides of the pivotal connection 26 are links 28 and 29 which are pivotally connected to the respective pistons 22 and 24. Thus, when the handle 27 is raised the low pressure piston goes down simultaneously with the elevation of the high pressure piston and when the handle 27 is depressed the action of the pistons is simultaneously reversed.

Communication between the fixed high pressure cylinder and the relatively rotatable low pressure cylinder is established preferably by means of a transfer passage constituted by ports 30, 31, 32 and 33, arranged along perpendicular diameters, formed in the body 1 and a passage 30' in the rotatable member 13. Said ports and said passage are in continuous communication with the high pressure cylinder 23 by means of an arcuate channel 34 formed in the rotatable member 13 into which the inner end of the passage 30' debouches and of such circumferential amplitude as to embrace any two of the ports 30 to 33. Thus regardless of the angular position of the rotatable member with respect to the fixed member, the communication between the low and high pressure cylinders remains uninterrupted.

A ball valve 35 controls the passage between the low and high pressure cylinders. It is springless since a spring would be of no value embedded in the stiff grease which the present grease gun is designed to carry. When open the ball valve rests upon the blunt end of a stud 36. The valve when closed rests upon an inverted conical seat 37 preferably formed in a separate bushing 38, the latter being capable of insertion into the low pressure cylinder 21 and screwed into place at its bottom. The passage 30' may be duplicated as shown in Figure 5 in order to increase the capacity of transfer of lubricant from the low to the high pressure cylinder.

The gun is charged through a cylindrical tube 39 suitably inserted in a recess in the rotatable member 13 and opening into the low pressure cylinder 21 by way of a port 40. Of course, it will be understood that the tube 39 could be made integral with the rotatable member 13 or secured to it in any desired and equivalent manner. The outer end of the tube 39 may be slightly flared as shown. In charging the gun, a stick of grease is inserted into the tube 39 and pressed into the low pressure cylinder 21 while the piston 22 is at the upper end of its stroke. A pusher which is shown per se in Figure 11 is preferably employed to insert the grease. The pusher comprises a plug 41 of any suitable material. If made of wood it is preferably shod at its lower end with a metallic bushing 42 pressed on to the reduced end of the plug. The inner end of the pusher is formed with a cylindrical indentation 43 corresponding in curvature to that of the low pressure cylinder. The pusher is preferably provided with a pin 44 cooperating with recesses 45 diametrically arranged in the outer end of the tube 39 so that when the pin is seated in said recesses the surface of the indentation 43 coincides with and forms a part of the wall of the low pressure cylinder thus assuring that the pusher cannot be inserted so far as to be in the path of the piston and yet make sure that substantially all of the grease will be sheared off from the end of the pusher upon the descent of the piston.

In that form of the invention which is now in course of description, compensation against wear of the pins 7 or the co-acting parts of the coupling is made by providing a shoulder 54 on the bushing 5 and causing it to co-act with a projecting set screw 55 which may be selectively fitted into any one of a circumferential series of threaded sockets 46 formed in the lower part 2 of the body 1. The extent to which the flange 6 may be screwed up toward the pins 7 may thus be determined from time to time. It will of course be understood that since the wear will be slow, a change in position of the set screw 55 need be made only at very infrequent intervals.

In the interest of securing optimum leverage and yet confining the grease gun to a minimum space, the handle 8 is made with a telescopic section 47 which may be pulled out to increase the effective length of the handle and pushed in for the sake of compactness.

In operation, the handle 27 is pushed down raising the piston 22 in the low pressure cylinder. A stick of grease is inserted in the tube 39 and pressed into the cylinder 21 into the path of the piston 22 by means of the pusher. The stick of grease could just as effectively be pushed in by means of the finger, but as has been stated, the pusher is a safety feature preventing the finger ever from getting in the path of the piston. When the stick of grease has been pushed in beneath the piston, the handle 27 is raised causing the piston 22 to shear off a charge of grease and upon a continuation of the downward stroke of the piston the grease thus pinched off is forced past the check valve 35 and through the transfer passage into the high compression cylinder 23. It will be understood that when first charging the gun perhaps two or three strokes of the piston 22 will be necessary in order to fill the voids below the check valve and beneath the piston in the high pressure cylinder. The handle 27 is then depressed causing the high pressure piston 24 to force the charge of grease partly against the check valve 35, closing it, and then through the discharge passage 48 into the nipple 4.

It will be understood that since the cylinder 23 is full of grease at the beginning of the downward stroke of the high pressure piston 24, the entire stroke of said piston is a pressure stroke and the volume of grease extruded by the gun will be much greater than if the piston were compelled to expend part of its working stroke in cutting off a charge from the grease stick.

Although the bushing 5 and the handle 8 have a definite position when the bushing is in tight coupled relation to the nipple, the rotatable nature of the member 13 and handle 27 permits the convenient use of the grease gun in quarters which would be impossible with a gun having a handle in a fixed plane relative to the coupling bushing.

Referring now to that form of the invention illustrated in Figures 9 and 10, the general construction is the same as in that form of the invention already described, the difference being such simplification in construction as is incident to the stationary relation of the low pressure cylinder to the high pressure cylinder. A simpler form of coupling is also shown, the socket 49 of which is formed of two members fixedly united having diametrically arranged bayonet slots 50 in the inner member adapted to be engaged with the pins on the nipple. The purpose of the outer member is to reinforce as well as to occlude the open outer sides of the bayonet slots and to prevent leakage of grease by way of said slots. In this form of the invention, no provision is made against rotation of the bottom surface 51 of the socket, and the top face of the nipple.

The construction and arrangement of the low and high compression cylinders and the pistons which operate therein is not different from that described in the first form of the invention, excepting that the body 1 and rotatable member 13 are substituted by a single integral block 52 in which the low and high compression cylinders are bored. In this form of the invention which represents a somewhat simpler gun, the seat 53 for the ball valve is ground into the block 52 instead of in a separate and replacable bushing, although the latter could be used if desired.

While we have in the above description disclosed what we believe to be preferred and practical embodiments of the invention, it is to be understood that the details of construction as illustrated and described are merely by way of example, and not to be construed as limiting the scope of the invention as claimed.

What we claim is:

1. Grease gun comprising a body having low and high pressure cylinders and a transfer passage therebetween, a check valve in said passage opening toward the high pressure cylinder, a piston in each cylinder, an operating lever connected to said pistons on opposite sides of the fulcrum of said lever whereby the pistons simultaneously travel oppositely, a tubular feed conduit opening laterally into said low pressure cylinder, a pusher in said conduit and a discharge passage from the high pressure cylinder.

2. Grease gun comprising a body having low and high pressure cylinders and a transfer passage therebetween, check valve in said passage opening toward the high pressure cylinder, a piston in each cylinder, an operating lever connected to said pistons on opposite sides of the fulcrum of said lever whereby the pistons simultaneously travel oppositely, a tubular feed conduit opening laterally into said low pressure cylinder, a pusher in said conduit, the inert end of said pusher being cylindrically concave, and inter-engaging means on said pusher and conduit for determining a position of said pusher in which the elements of its cylindrical concavity are parallel with the elements of the low pressure cylinder, a coupling on said body and a discharge passage from said high pressure cylinder extending through said coupling.

3. Grease gun comprising a body having low and high pressure cylinders and a transfer passage therebetween, a ball check valve in said passage opening toward the high pressure cylinder, the wall of said passage being provided with an inverted conical surface affording a seat for said ball and being of sufficient extensiveness to guide said ball to its seat, and adjustable stop determining the open position of said ball, said stop being of such smallness as to leave the major portion of the lower surface of said ball exposed to upwardly directed grease pressure, a piston in each cylinder, an operating lever connected to said pistons on opposite sides of the fulcrum of said lever, whereby the pistons simultaneously travel oppositely, a tubular feed conduit opening laterally into said low pressure cylinder, a pusher in said conduit, said body being provided with a coupling and a discharge passage from said high pressure cylinder passing through said coupling.

4. Grease gun comprising a body including a fixed member and a member rotatable thereabout, a coupling having an element fixed with respect to said fixed member, said rotatable and fixed members having respectively low and high pressure cylinders, a transfer passage connecting said cylinders and so arranged as to provide uninterrupted communication therebetween regardless of the position of orientation of said rotatable member with respect to said fixed member, a check valve in said passage opening toward the high pressure cylinder, a piston in each cylinder, an operating lever fulcrumed on said rotatable member and connected to said pistons on opposite sides of said fulcrum whereby the pistons simultaneously travel oppositely, a lateral feed port in the low pressure cylinder and a discharge passage from the high pressure cylinder extending through the said element of the said coupling.

5. Grease gun comprising a body including a fixed member and a member rotatable thereabout, a coupling having an element fixed with respect to said fixed member, said rotatable and fixed members having respectively low and high pressure cylinders, a transfer passage connecting said cylinders comprising a plurality of spaced ducts in said fixed member communicating with said high pressure cylinder and a duct communicating with said low pressure cylinder debouching into an arcuate channel adjacent said fixed member of sufficient amplitude to constantly communicate with at least one of the spaced ducts in said fixed member, a check valve in said passage opening toward the high pressure cylinder, a piston in each cylinder, an operating lever fulcrumed on said rotatable member and connected to said pistons on opposite sides of said fulcrum whereby the pistons simultaneously travel oppositely, a lateral feed port in the low pressure cylinder and a discharge passage from the high pressure cylinder extending through the said element of the said coupling.

6. Grease gun comprising a body including a fixed member having a cylindrical exterior portion and a member rotatable about said cylindrical portion forming a close joint with said fixed member, a coupling having an element fixed with respect to said fixed member, said rotatable and fixed members being provided respectively with low and high pressure cylinders, a transfer passage connecting said cylinders comprising a plurality of spaced ducts in said fixed member opening in the cylindrical exterior surface thereof, and a duct in said rotatable member debouching into an arcuate slot adjacent the exterior ends of the first named ducts and of sufficient amplitude to communicate constantly with at least one of the ducts in said fixed member irrespective of the position of orientation of said rotatable member, a check valve in that part of said passage in said rotatable member opening toward the high pressure cylinder, a piston in each cylinder, an operating lever fulcrumed on said rotatable member and connected to said pistons on opposite sides of said fulcrum whereby the pistons simultaneously travel oppositely, a lateral feed port in the low pressure cylinder, and a discharge passage from the high pressure cylinder extending through the said element of the said coupling.

7. Grease gun as claimed in claim 6, the lateral feed port comprising a tubular extension, and a pusher in said extension.

8. Grease gun as claimed in claim 6, the transfer passage in said rotatable member being provided with an inverted conical surface affording a seat for said check valve and being of sufficient extensiveness to guide said valve to said seat, an adjustable stop engaged by said valve in its open position, said stop being of sufficiently small size to leave the major portion of the lower surface of said valve exposed to upward grease pressure.

9. Grease gun comprising a body including a fixed member having a cylindrical exterior portion, and a member rotatable about said cylindrical portion forming a close joint with said fixed member, a coupling having an element fixed with respect to said fixed member, said rotatable and fixed members being provided respectively with low and high pressure cylinders, a transfer passage connecting said cylinders comprising an arcuate channel in one of said members and a duct in said other member in continual communication with said channel irrespective of the angular displacement of said rotatable member with respect to said fixed member, a check valve in that part of said passage in said rotatable member opening toward the high pressure cylinder, a piston in each cylinder, an operating lever fulcrumed on said rotatable member and connected to said pistons on opposite sides of said fulcrum whereby the pistons simultaneously travel oppositely, a lateral feed port in the low pressure cylinder, and a discharge passage from the high pressure cylinder passing through the said element of the said coupling.

10. Grease gun comprising a body, a high pressure cylinder, an auxiliary cylinder of larger diameter than the high pressure cylinder, and a transfer passage therebetween, a check valve in said passage opening toward the high pressure cylinder, a piston in each cylinder, an operating lever connected to said pistons on opposite sides of the fulcrum of said lever, whereby the said pistons simultaneously travel oppositely, a lateral feed port in the larger cylinder, said larger cylinder having a capacity below said feed port approximately sufficient to fill the displacement of the full stroke of the high pressure piston, and a discharge passage from the high pressure cylinder.

11. Grease gun comprising a body, a high pressure cylinder, an auxiliary cylinder of larger diameter than the high pressure cylinder, and a transfer passage therebetween, a check valve in said passage opening toward the high pressure cylinder, a piston in each cylinder, an operating lever connected to said pistons on opposite sides of the fulcrum of said lever, whereby the said pistons simultaneously travel oppositely, a lateral feed port in the larger cylinder, said larger cylinder having a capacity below said feed port approximately sufficient to fill the displacement of the full stroke of the high pressure piston, said high pressure cylinder being provided with a discharge nozzle having means for detachably connecting it to a grease fitting.

12. Grease gun comprising a body, a high pressure cylinder, an auxiliary cylinder of larger diameter than the high pressure cylinder, and a transfer passage therebetween, a check valve in said passage opening toward the high pressure cylinder, a piston in each cylinder, an operating lever connected to said pistons on opposite sides of the fulcrum of said lever, whereby the said pistons simultaneously travel oppositely, a tubular feed conduit open at its outer end to receive a grease stick, and communicating laterally at its other end with said larger cylinder, the latter cylinder having a capacity below said feed conduit approximately sufficient to fill the displacement of the full stroke of the high pressure piston, and a discharge passage from the high pressure cylinder.

ERNEST B. NORMAN.
GEORGE A. PETTIT.